(12) United States Patent
Burman

(10) Patent No.: US 7,230,755 B2
(45) Date of Patent: Jun. 12, 2007

(54) BUILDING WITH ROOF MOUNTED PERISCOPE

(76) Inventor: Allan V. Burman, 1515 N. Highland St., Arlington, VA (US) 22201

( * ) Notice: Subject to any disclaimer, the term of this patent is extended or adjusted under 35 U.S.C. 154(b) by 0 days.

(21) Appl. No.: 11/401,407

(22) Filed: Apr. 11, 2006

(65) Prior Publication Data

US 2006/0176551 A1    Aug. 10, 2006

Related U.S. Application Data

(63) Continuation-in-part of application No. 10/843,445, filed on May 12, 2004, now abandoned.

(60) Provisional application No. 60/503,493, filed on Sep. 17, 2003.

(51) Int. Cl.
*G02B 23/08* (2006.01)
*G02B 23/22* (2006.01)
*E04B 1/32* (2006.01)

(52) U.S. Cl. ............... 359/402; 359/406; 359/399

(58) Field of Classification Search ........ 359/399–409, 359/425–426, 808–819
See application file for complete search history.

(56) References Cited

U.S. PATENT DOCUMENTS

| | | | |
|---|---|---|---|
| 53,115 A * | 3/1866 | Clark | ............... 359/406 |
| 1,298,333 A | 3/1919 | Grebe | ............... 359/406 |
| 1,341,683 A | 6/1920 | Styll | ............... 359/405 |
| 2,423,267 A | 7/1947 | Strang | ............... 359/402 |
| 3,660,951 A | 5/1972 | Cadwell | ............... 52/2.18 |
| 4,462,684 A | 7/1984 | Abler | ............... 356/145 |
| 4,701,602 A | 10/1987 | Schaefer et al. | ............... 472/136 |
| 4,818,232 A | 4/1989 | Pruitt | ............... 434/23 |
| 4,823,824 A | 4/1989 | Smith | ............... 135/120.1 |
| 4,918,881 A | 4/1990 | Cottle et al. | ............... 52/65 |
| 5,485,306 A | 1/1996 | Kiunke et al. | ............... 356/139.08 |
| 5,916,097 A | 6/1999 | Markuten | ............... 52/81.2 |
| 6,174,242 B1 | 1/2001 | Briggs et al. | ............... 359/419 |

* cited by examiner

*Primary Examiner*—Thong Q Nguyen
(74) *Attorney, Agent, or Firm*—Dinesh Agarwal, P.C.

(57) ABSTRACT

A periscope is mounted through the roof and into a room within a building, such as a house or the like, whereby people in the building can view scenes outside without leaving the building. The periscope extends from a room in the building, such as a living room of a house, upwardly through any overhead ceilings and floors and through the roof. Further, the periscope extends above the topmost roofline for increased distance viewing or viewing over obstacles. Using an eyepiece at the bottom of the periscope, a user can then see outside areas, including distant areas, while remaining in the comfort of his or her house. The building can be any permanent dwelling structure, such as a house, apartment, single story building, multistory building, condominium, cottage, cabin, beach house or the like, in a residential or commercial setting.

20 Claims, 2 Drawing Sheets

BUILDING WITH ROOF MOUNTED PERISCOPE

CROSS-REFERENCE TO RELATED APPLICATIONS

This application is a Continuation-in-Part of Ser. No. 10/843,445, filed May 12, 2004 now abandoned, which is based upon and claims the benefit of Provisional Application Ser. No. 60/503,493, filed Sep. 17, 2003, which are hereby incorporated herein in their entirety by reference.

FIELD AND BACKGROUND OF THE INVENTION

It has long been desired to be able to see extended or distant outside areas from within a building or dwelling. In the past these views have best been achieved from atop or on the roof of the building or house. For example, many coastal homes were constructed during the early sailing or seafaring era with roof mounted or raised platforms or balconies ("widow walks") whereby distant views of the ocean and ships thereon or surrounding areas could be achieved. These roof-mounted platforms, however, are expensive to build and are difficult to reach due to their location on the roof of the house. Further, their viewing advantage was limited to the height of the roof and they were usable only in calm, dry weather.

The desire to see or view the outside areas is more understandable, and even vital, from within a building, and particularly a dwelling, such as a house, apartment, cabin, cottage, and the like, which is located in a coastal area subject or prone to hurricanes, storms, tornadoes, flooding, etc. For instance, the Southern States of Florida, Georgia, Louisiana and Texas are routinely hit by severe storms and high-category hurricanes every year. The damage caused by Hurricane Katrina last year is a constant reminder of the power of these types of hurricanes. Likewise, several Central States are routinely the subject of tornadoes. In fact, the central part of the United States is traditionally known as "Tornado Alley", which includes Arkansas, Colorado, Illinois, Indiana, Iowa, Kansas, Kentucky, Louisiana, Missouri, North Dakota, Nebraska, Ohio, Oklahoma, South Dakota, Tennessee, Texas and Wyoming.

Under severe adverse conditions, and particularly, in the early stages of weather forecast, it is common for residents and businesses to board-up the windows and take cover inside their dwellings until conditions improve or are better, or it is safe to go outside. Due to the uncertainty and depending on the severity of the adverse weather conditions, residents are frequently confined to the inside of their dwellings for long hours, and even days. It is also not uncommon to be without power, electricity, or even telephone service, while staying inside for extended periods of time. With almost zero or very little communication with the outside world, combined with the unpredictability and uncertainty of the severe weather conditions, the desire and necessity to learn more about the outside conditions can grow by the minute. In these situations, or perhaps where it is plainly not safe to venture outside, it would be highly desirable to have a mechanism, such as a periscope, to view the external conditions without having to actually step outside.

The prior art shows examples of periscopes in children's toy apparatus. For example, U.S. Pat. No. 5,916,097 discloses a child's play apparatus, which may include, but does not show, a periscope near the top thereof. U.S. Pat. No. 4,823,824 discloses a tent with a periscope. U.S. Pat. No. 3,660,951 discloses a shock shielding structure, which may include a periscope for exterior viewing in case of attack or war. Other U.S. Pat. Nos. 1,298,333; 1,341,683; 2,423,267; 4,462,684; 4,701,602; 4,818,232; 4,918,881; 5,485,306; and 6,174,242 disclose various periscopes, telescopes, etc. However, none of these patents relate to permanent dwelling structures or buildings or to such structures with a periscope for exterior viewing.

OBJECTS AND BRIEF SUMMARY OF THE INVENTION

The principal object of the present invention is to provide means for viewing, judging, or assessing the outside conditions from a permanently built structure or building, residential or commercial, and particularly from a dwelling such as a house, apartment, cabin, cottage, and the like, which is meant or built to exist perpetually.

Another object of the present invention is to provide means for viewing, judging, or assessing the outside conditions from a permanently built structure or building, which is anchored or attached to the ground by a foundation/footing or the like structure.

Another object of the present invention is to provide means for viewing, judging, or assessing the outside conditions from within a fixed, immovable, and/or permanently built structure or building, and particularly a dwelling or place to live in indefinitely or permanently, such as a house, apartment, cabin, cottage, and the like.

Another object of the present invention is to provide means for viewing, judging, or assessing the outside conditions from within a permanently built structure or building, which is not a temporary or portable shelter.

Another object of the present invention is to provide a periscope in combination with a permanently built structure or building, and particularly a dwelling, such as a house, apartment, cabin, cottage, and the like, which is a place to live in indefinitely or permanently, and which is fixed, immovable, and meant or built to exist perpetually.

In summary, my invention provides a raised viewing system for a permanently mounted or built structure, such as a building or house or the like, without resorting to building a viewing platform on the roof of the structure. In particular, I have invented the combination of a building or dwelling structure, such as a house, apartment, cottage, or cabin, and a periscope mounted through the roof of the building or dwelling to extend from a room on a first, second, or higher floor within the house to a height above the house roof. This allows viewing of surrounding sights from an increased height without the need to construct, or climb up to, a roof-mounted platform. Further, the periscope is usable in all types of weather, particularly in severe weather conditions, such as hurricanes, tornadoes, etc., and is adjustable in height thereby providing increased viewing options. Further, the periscope can have telescopic and/or wide-angle optics providing increased viewing options. The periscope is rotatably mounted for full circular area viewing around the dwelling site.

The roof-mounted periscope allows the building occupants to view distant areas around the building without having to venture outside or being exposed to inclement or severe weather, that could be life-threatening. Further, the roof-mounted periscope allows beach area building occupants the option of an "ocean view" even if their home is spaced back from the ocean or has other beach houses or sand dunes separating them from the beach.

The periscope is mounted substantially vertically through the roof of the building with the bottom or viewing eyepiece being preferably located in a common room of the building, such as the living or family room on the first floor, or on a higher floor, or in the basement. Also, the periscope would have a sliding, albeit weather tight, mounting mechanism through the roof of the house such that the periscope can be vertically raised or lowered as desired. The periscope is also horizontally rotatably mounted to allow full 360 degree viewing. Accordingly, users will be able a view from the house objects or general sea or landscapes areas from different heights and directions.

BRIEF DESCRIPTION OF THE DRAWINGS

One of the above and other objects, novel features and advantages of the present invention will become apparent from the following detailed description of the preferred embodiment(s) invention, as illustrated in the drawings, in which.

DETAILED DESCRIPTION OF THE PREFERRED EMBODIMENT(S) OF THE INVENTION

Figure 1:
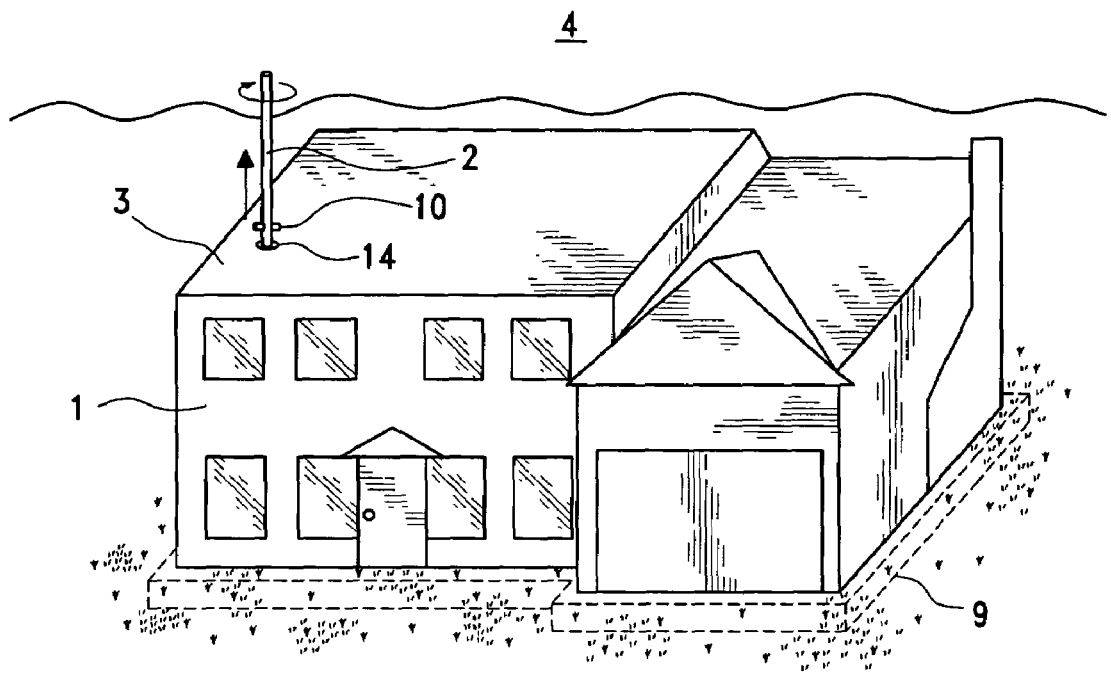
FIG. 1 is a view of a house, or the like, with the periscope protruding therefrom, showing the foundation in phantom lines.

Referring to FIG. 1, the invention comprises the combination of a dwelling or house 1, such as a permanently mounted or built house, apartment, cabin, cottage, or the like, having a periscope 2 extending through roof 3. The dwelling 1 includes rigid, non-collapsible walls 8 made of conventional solid building materials, such as concrete, bricks, cinder blocks, etc. More specifically, the walls 8 are rigid and non-collapsible in nature and construction. The house is shown near an ocean 4 or the like, and includes a solid foundation/footing 9 making it fixed and immovable. The foundation 9 is also constructed to be rigid, non-collapsible and is made of conventional solid building materials, such as concrete, bricks, cinder blocks, etc. Flashing or seal 14, around the periscope 2 where it passes through the roof 3, is to insure weather tight sealing between the roof and periscope. Means 10 are provided on casing 5 above the roof 3 to limit downward movement of the periscope 2 into the roof 3.

Figures 2, 3:
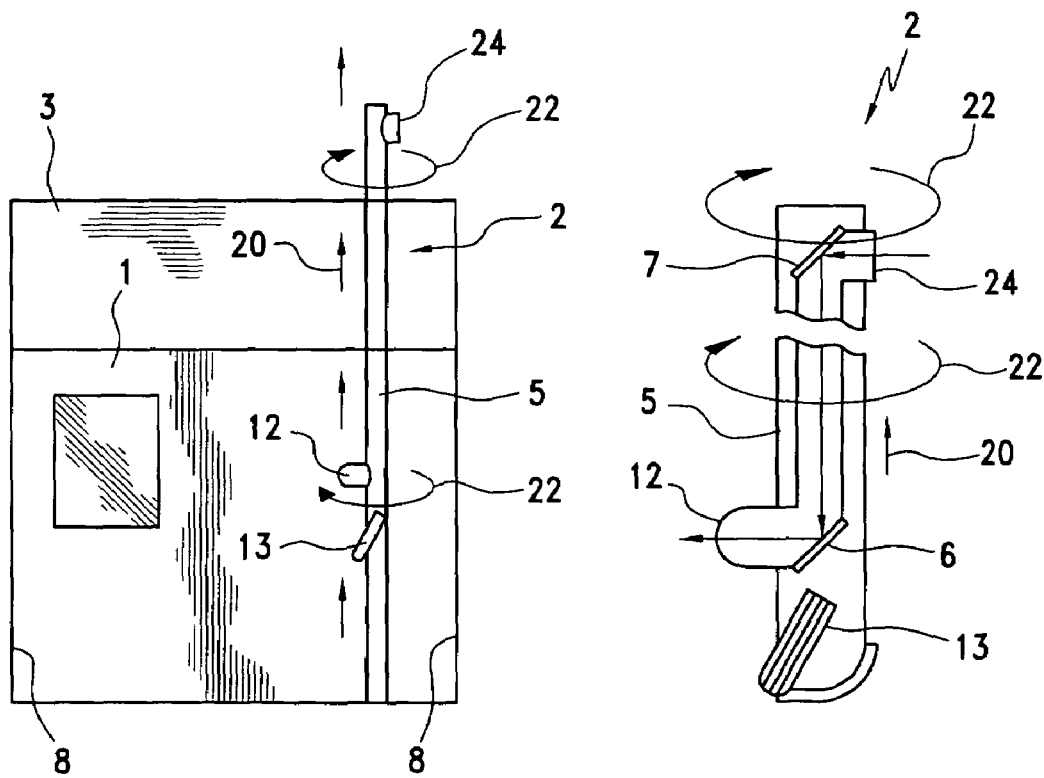
FIG. 2 shows a cutaway of the house with the periscope extending through the roof and down into a room of the house.
FIG. 3 shows an enlarged view of the periscope.

As shown in FIG. 2, the periscope 2 includes a tubular casing 5, which extends through flashing or seal 14 and is itself weather tight with the seal 14 as will be explained below. Furthermore, the periscope is movable vertically up or down through flashing or seal 14, as shown by arrows 20, and can rotate horizontally as shown by arrows 22. Periscope 2 may be raised and secured in a high position within the room to be out of the way when not in use. For example, tubular casing 5 may be constructed to telescope on itself when in the stored position.

The periscope 2, noting FIG. 3, includes tubular casing 5, internal mirrors 6 and 7 within casing 5, and an eyepiece 12 and an external lens 24 at opposite ends of casing 5. The two mirrors 6 and 7 are mounted in the periscope 2 at approximately 45 degrees from the vertical to allow substantially horizontal viewing through the periscope. The length of tubular casing 5 is chosen to allow the periscope to extend from a room in the house 1 up and through the roof 3 of the house. The length will also be sufficient to allow periscope 2 to extend through any intervening rooms or stories of the house (see FIGS. 2 and 4-5). The bottom or eyepiece end of the periscope may include handles 13 to assist in rotating the periscope horizontally while being used. The handles 13 also assist in raising the periscope up and out of the way when not in use. The upper mirror 7 and external lens 24 may be configured to allow wide angle viewing, if desired. The handles 13 would also be used for focusing of the periscope optical system.

Thus, someone in the house, using the eyepiece end of the periscope is able see increased distant viewing from the house. The periscope height may be raised or lowered as desired as well as rotated for increased viewing options.

Figure 4:
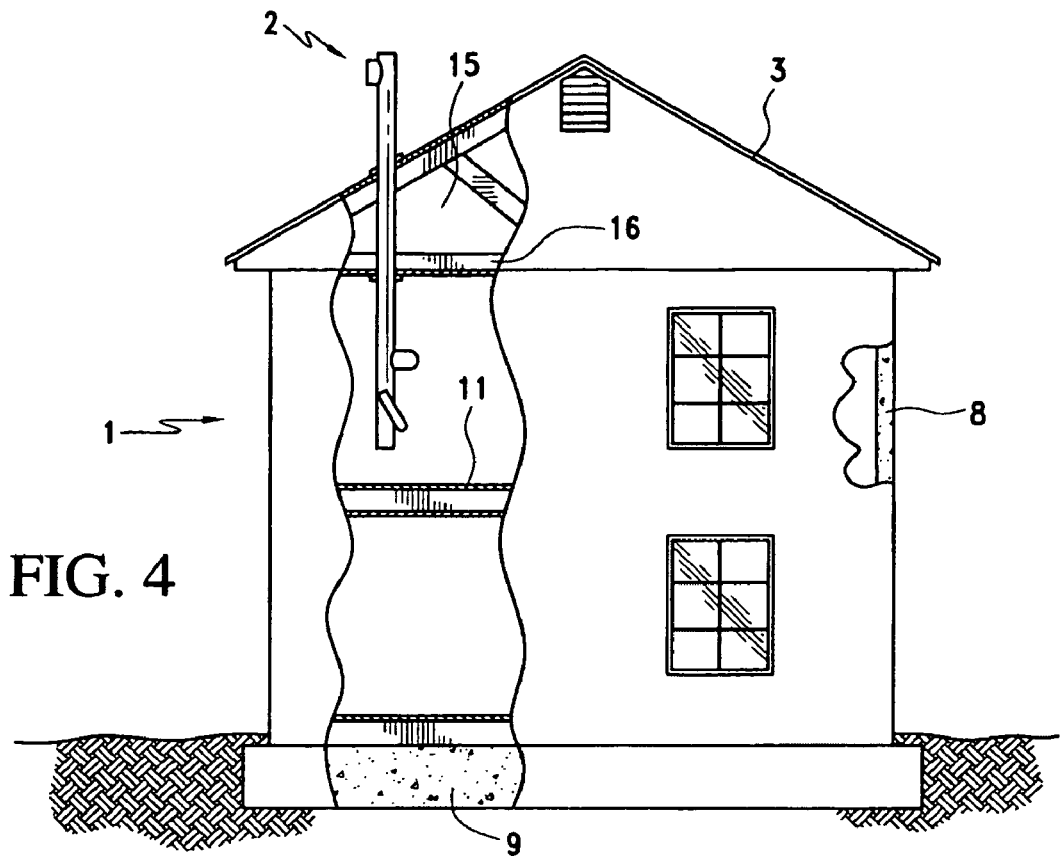
FIG. 4 is a left side view of the house with a portion broken-away to show the periscope extending through the roof, the attic and the top ceiling/floor and down into a room on the second floor thereof.

Referring to FIG. 4, the periscope 2 extends down to the top or second floor 11 of the house 1, through the roof 3, the attic 15, and the top ceiling/floor 16.

Figure 5:
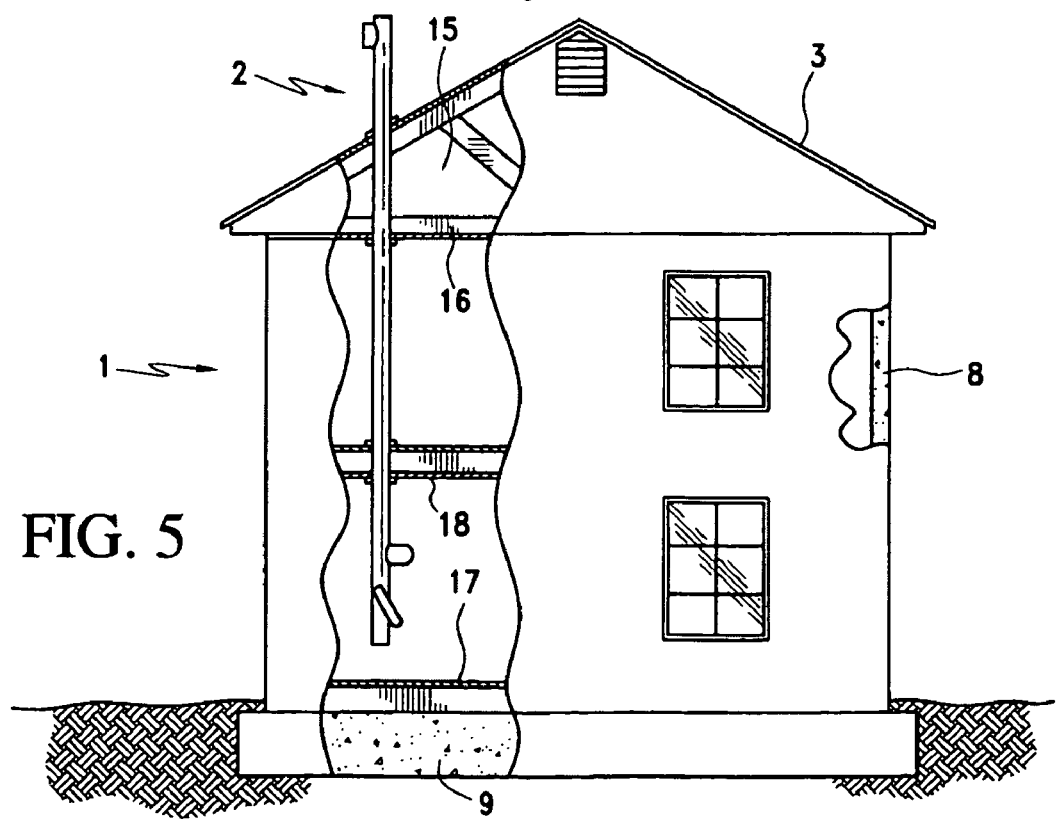
FIG. 5 is a view similar to FIG. 4, showing the periscope extending down into a room on the first floor of the house.

Referring to FIG. 5, the periscope 2 extends down to the main or first floor 17 of the house 1, through the roof 3, the attic 5, the top ceiling/floor 16, and the first floor ceiling 18.

Although not shown, the periscope 2 can extend through multiple floors down to a desired floor or level. Such embodiment would be particularly useful in a multistory apartment, condominium, or office building, either in a residential or commercial setting.

It is noted herewith that in the present invention, the house or dwelling 1 is intended to be permanent, non-collapsible in nature and construction that is built to be immovable, as opposed to, for example, a place of temporary refuge or residence, such as a submarine, tent, or shelter, which are built to be collapsible and/or movable from one location to another.

While this invention has been described as having preferred sequences, ranges, steps, materials, structures, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the appended claims.

What is claimed is:

1. In combination, a permanently built building having a foundation and a roof, and a periscope means mounted through said roof, said building comprising solid building materials forming rigid, non-collapsible walls, at least one floor and said roof, said periscope means extending substantially vertically through said roof and said at least one floor, said periscope means including a lower eyepiece end positioned within said building and an upper, exterior end extending through and to a position above said roof, whereby a user of said building can view an exterior area around said building from within said building using said periscope means.

2. The combination of claim 1, wherein said periscope means is vertically adjustable to change the lower eyepiece height position of said periscope means within said building and to also raise or lower the height of the exterior end of said periscope means above said roof.

3. The combination of claim 1, further comprising sealing means to permanently seal said periscope means to said building as it extends through the roof of said building.

4. The combination of claim 1, further comprising means rotatably mounting said periscope means whereby the viewing area of said periscope means could encompass an arcuate or circular area.

5. The combination of claim 1, wherein said building is a dwelling structure.

6. The combination of claim 5, wherein said dwelling structure comprises solidly built walls, floors, one or more ceilings, and a roof, whereby said periscope means lower end extends into a room defined by one of said walls, one of said floors and one of said ceilings and extends up and through said roof.

7. The combination of claim 1, wherein said building is selected from the group consisting of a house, a single story building, a multistory building, a cabin, and a cottage.

8. The combination of claim 1, wherein the building is immovable.

9. The combination of claim 1, wherein said periscope means extends through two of said floors of said building.

10. A permanently built structure, comprising:
   a) at least one floor, a foundation, rigid, non-collapsible walls and a roof to form an enclosed structure;
   b) a periscope extending through said floor; and
   c) means for mounting said periscope substantially vertically within the enclosed structure to extend therefrom through said roof.

11. The structure of claim 10, wherein said periscope comprises a hollow member having an eyepiece at one end thereof and a lens at the other end thereof, said eyepiece end being within said enclosed structure and said other end being spaced above said roof.

12. The structure of claim 11, wherein said hollow member is tubular.

13. The structure of claim 12, further comprising means mounting said periscope for vertical movement through said roof.

14. The structure of claim 12, further comprising means forming a watertight seal around said tubular member where it passes through said roof.

15. The structure of claim 11, further comprising means mounting said periscope for vertical movement through said roof.

16. The structure of claim 10, further comprising means mounting said periscope for vertical movement through said roof.

17. The structure of claim 10, wherein said periscope is rotatably mounted to allow viewing in a circular area.

18. The structure of claim 10, wherein said permanently built structure is selected from the group consisting of a house, a single story building, a multistory building, a dwelling, a cabin, and a cottage.

19. The structure of claim 10, wherein said structure is immovable.

20. The structure of claim 10, wherein said structure comprises a plurality of said floors, and said periscope extends through two of said floors.

* * * * *